US010229128B2

(12) United States Patent
Lu et al.

(10) Patent No.: US 10,229,128 B2
(45) Date of Patent: Mar. 12, 2019

(54) METHOD AND APPARATUS FOR THE GENERATION, ORGANIZATION, STORAGE AND RETRIEVAL OF TIME STAMPED BLOCKS OF DATA

(71) Applicant: Rubrik, Inc., Palo Alto, CA (US)

(72) Inventors: Maohua Lu, Fremont, CA (US); Pin Zhou, San Jose, CA (US); Neville Carvalho, Saratoga, CA (US); Ajaykrishna Raghavan, Santa Clara, CA (US); Tarun Thakur, Fremont, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 459 days.

(21) Appl. No.: 14/946,491

(22) Filed: Nov. 19, 2015

(65) Prior Publication Data

US 2016/0140133 A1 May 19, 2016

Related U.S. Application Data

(60) Provisional application No. 62/081,934, filed on Nov. 19, 2014.

(51) Int. Cl.
*G06F 17/30* (2006.01)
(52) U.S. Cl.
CPC .......................... *G06F 17/30088* (2013.01)

(58) Field of Classification Search
CPC ................................................. G06F 17/30088
See application file for complete search history.

(56) References Cited

U.S. PATENT DOCUMENTS

| 4,646,229 A * | 2/1987 | Boyle .............. G06F 17/30958 |
| 2002/0099729 A1* | 7/2002 | Chandrasekaran ........................ G06F 11/1471 |
| 2013/0325810 A1* | 12/2013 | Elder ............... G06F 17/30309 707/645 |
| 2014/0095432 A1* | 4/2014 | Trumbull ............... G06F 17/30 707/610 |
| 2015/0088822 A1* | 3/2015 | Raja .................. G06F 17/30324 707/625 |
| 2015/0379065 A1* | 12/2015 | Yoshizawa ........ G06F 17/30309 707/689 |

\* cited by examiner

*Primary Examiner* — Jared M Bibbee
(74) *Attorney, Agent, or Firm* — Schwegman Lundberg & Woessner, P.A.

(57) ABSTRACT

Embodiments disclosed herein provide systems, methods, and computer readable media to enhance the organization, storage, and retrieval of data. In a particular embodiment, a method provides storing a plurality of incremental data versions in a data repository and maintaining first time information for data items in each of the incremental data versions. The method further provides identifying a first data version of the plurality of incremental data versions and writing data in the data repository to create a second data version based the first data version. The method then provides second time information associated with the creation of the second data and creation of the first data version.

20 Claims, 10 Drawing Sheets

METHOD AND APPARATUS FOR THE GENERATION, ORGANIZATION, STORAGE AND RETRIEVAL OF TIME STAMPED BLOCKS OF DATA

RELATED APPLICATIONS

This application is related to and claims priority to U.S. Provisional Patent Application 62/081,934, titled "METHOD AND APPARATUS FOR THE GENERATION, ORGANIZATION, STORAGE AND RETRIEVAL OF TIME STAMPED BLOCKS OF DATA," filed Nov. 19, 2014, and which is hereby incorporated by reference in its entirety.

TECHNICAL BACKGROUND

A variety of computing technology exists that time-stamps data within a data storage system. For example, most operating systems record the date and time that each file was most recently saved. Some operating systems also record the creation date and time for each file.

Revision control systems track changes to a file each time it is saved, and allow a user to select between the various save points when retrieving the file. This maintains the initial contents of the file and all changes made to the file each time it was saved, and allows the user to retrieve any version of the file that was previously saved.

OVERVIEW

Embodiments disclosed herein provide systems, methods, and computer readable media to enhance the organization, storage, and retrieval of data. In a particular embodiment, a method provides storing a plurality of incremental data versions in a data repository and maintaining first time information for data items in each of the incremental data versions. The method further provides identifying a first data version of the plurality of incremental data versions and writing data in the data repository to create a second data version based the first data version. The method then provides second time information associated with the creation of the second data and creation of the first data version.

In some embodiments, a third data version of the plurality of data versions depends from the first data version and was stored before creation of the second data version.

In some embodiments, the method provides merging the first data version with a fourth data version of the plurality of data versions upon which the first data version depends to generate a fifth data version;

storing the fifth data version in the data repository, wherein the second data version and the third data version depend from the fifth data version after the merging.

In some embodiments, the method provides deleting the first data version and the fourth data version from the data repository.

In some embodiments, the first data version is not the most recently stored data version.

In some embodiments, the first time information indicates when each incremental data version of the plurality of incremental data versions was created.

In some embodiments, maintaining first time information comprises storing metadata including the first time information when each of the plurality of incremental data versions is stored.

In some embodiments, the metadata includes an indicator of which incremental data version of the plurality of incremental data versions each data item of the first data version is stored.

In some embodiments, the indicator comprises at least one pointer.

In some embodiments, the first data version is identified as corresponding to a time parameter provided by a user.

In another embodiment, a data processing system is provided that includes one or more computer readable storage media and a processing system operatively coupled with the one or more computer readable storage media. Program instructions stored on the one or more computer readable storage media, when read and executed by the processing system, direct the processing system to store a plurality of incremental data versions in a data repository and maintain first time information for data items in each of the incremental data versions. The program instructions further direct the processing system to identify a first data version of the plurality of incremental data versions and write data in the data repository to create a second data version based the first data version. Also, the program instructions direct the processing system to maintain second time information associated with the creation of the second data and creation of the first data version.

This overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Front a data protection repository, users can run analytical workload directly on any point-in-time data without first restoring all data from the specific point-in-time data. The exposed application interfaces (such as file system interfaces) need to provide the time dimension of the data, and the capability to accept writes to any point-in-time data. The underlying system implements three capabilities: 1) quickly put the fragmented data pieces together to provide the point-in-time data to the user, 2) accept writes to the specific point-in-time data and record the metadata accordingly, 3) allow users to manage the version tree of the point-in-time data by allowing merges. With these capabilities, the user can leverage the write active time machine to quickly find out the value of point-in-time data, run analytical workload with writes, and thus allow a wider spectrum of analytical workload to run on point-in-time data to extract insights directly from specific point-in-time data without restoring the data.

Existing systems do not provide write active time machine functionality on a secondary data repository, which exposes interfaces to the user so that the user can directly run applications with writes on the point-in-time data in the secondary repository without restoring the data.

File system interfaces are exposed to users so that users can directly run applications on the point-in-time data in the secondary repository. The secondary repository needs to accept the writes by redirecting the writes to a free data block and remember the locations of the writes in the repository metadata. The repository metadata needs to organize the metadata in a tree structure to support the branching of the historical data. The metadata needs to provide a pruning interface so that users can prune branches she does not need anymore. The pruning can be done by removing a branch from the metadata and mark the related data as unused.

Active time machine quickly finds out the mapping between the user requested point-in-time data and the stored fragmented data pieces, and provides interfaces to present the point-in-time data to the user and allow the user to directly run read/write applications on the point-in-time data as well to manage the data version tree.

Figure 1A:
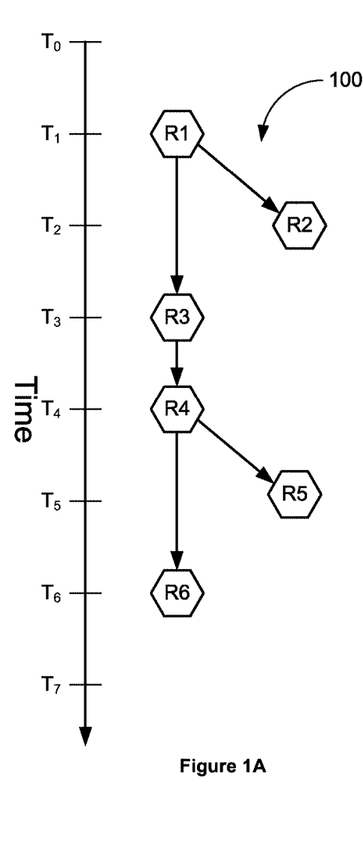
FIGS. 1A and 1B illustrate example data version trees showing the results of a sequence of writes.
Figure 1B:
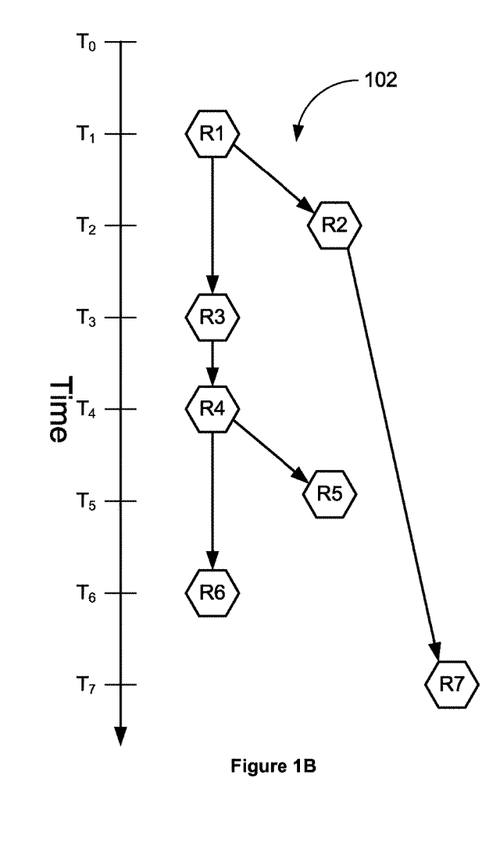

FIGS. 1A and 1B illustrate example data version trees showing the results of a sequence of writes. In FIG. 1A, initial version tree 100 illustrates six versions of point-in-time data within a data repository with respect to the point-in-time when each version was created. Revision R1 was created at time $T_1$, revision R2 was created at time $T_2$ and was based on revision R1, revision R3 was created at time $T_3$ and was based on revision R1 revision R4 was created at time $T_4$ and was based on revision R3, revision R5 was created at time $T_5$ and was based on revision R4, and revision R6 was created at time $T_6$ and was based on revision R4.

In FIG. 1B, post-write version tree 102 illustrates the result of a write on the version tree illustrated in FIG. 1A. In this example, revision R7 was created at time $T_7$, and was based on revision R2.

Figure 2:
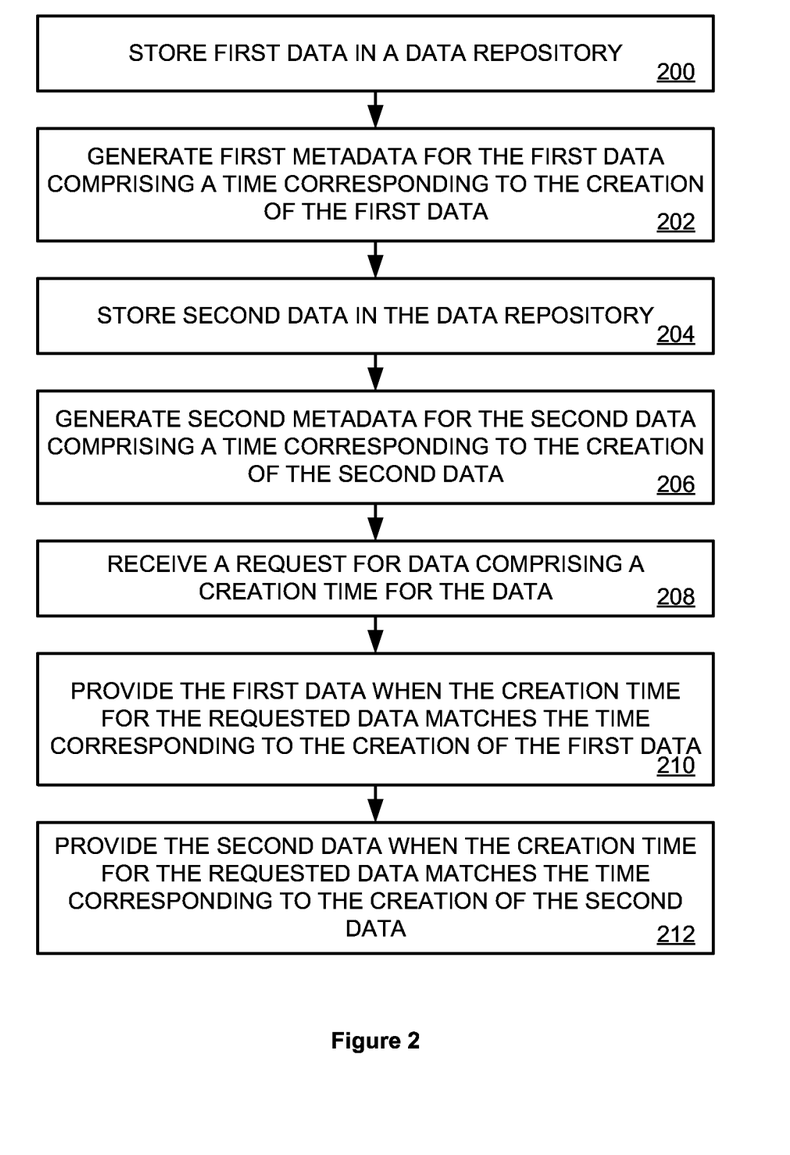
FIG. 2 illustrates a flow chart of a method of generating, organizing, storing, and retrieving time-stamped blocks of data.

FIG. 2 illustrates a flow chart of a method of generating, organizing, storing, and retrieving time-stamped blocks of data. In this example embodiment, various blocks of data are organized, stored, and retrieved by data processing systems such as those illustrated in FIGS. 3 and 7 and described later. Various operations of this method may be performed by one or more data processing systems, and there is no need to tie any operation to any specific data processing system as general purpose computers may be configured to operate as a capable of performing the operations of the method described herein.

Figure 3:
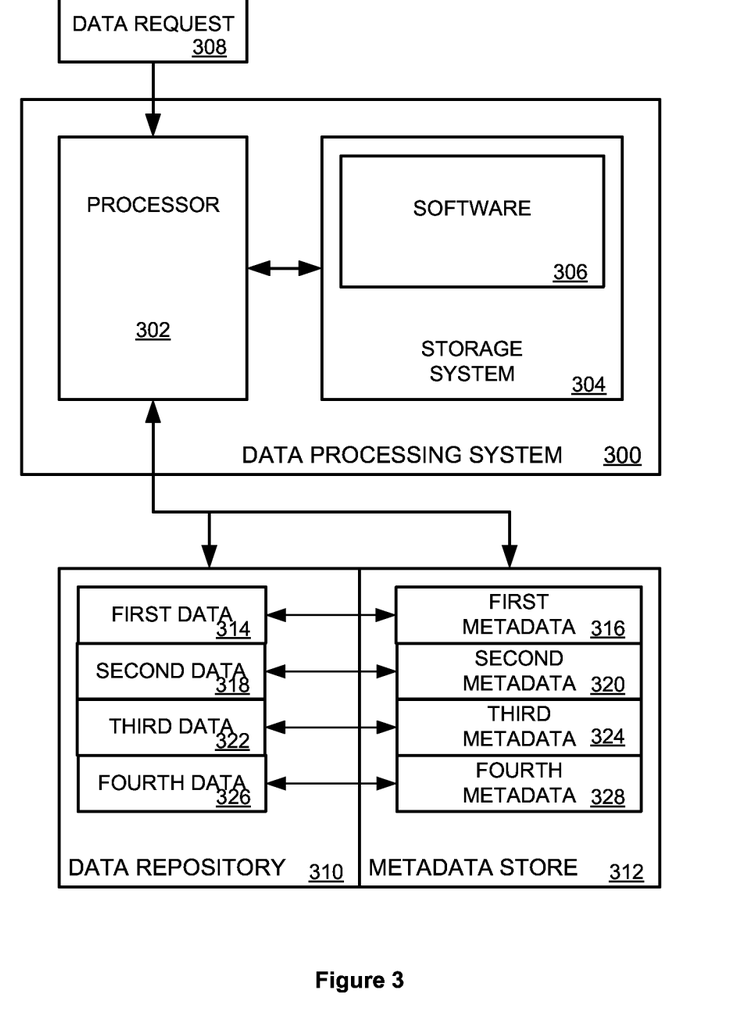
FIG. 3 illustrates a block diagram of a computer system configured to operate as a data processing system.

Data processing system 300 stores first data 314 in a data repository 310, (operation 200). Data processing system 300 then generates first metadata 316 for first data 314 comprising a time corresponding to the creation of first data 314, (operation 202).

Data processing system 300 stores second data 318 in a data repository 310, (operation 204). Data processing system 300 then generates second metadata 320 for second data 318 comprising a time corresponding to the creation of second data 318, (operation 206).

Data processing system 300 receives a data request 308 comprising a creation time for the requested data, (operation 208). If the creation time for the requested data matches the time corresponding to the creation of first data 314 found within first metadata 316, data processing system 300 provides the first data 314, (operation 210). If the creation time for the requested data matches the time corresponding to the creation of second data 318 found within second metadata 320, data processing system 300 provides the second data 318, (operation 212).

Referring now FIG. 3, data processing system 300 and the associated discussion are intended to provide a brief, general description of a suitable computing environment in which the process illustrated in FIG. 2 may be implemented. Many other configurations of computing devices and software computing systems may be employed to implement a system for the efficient storage, organization, and indexing of data blocks corresponding to particular creation times.

Figure 7:
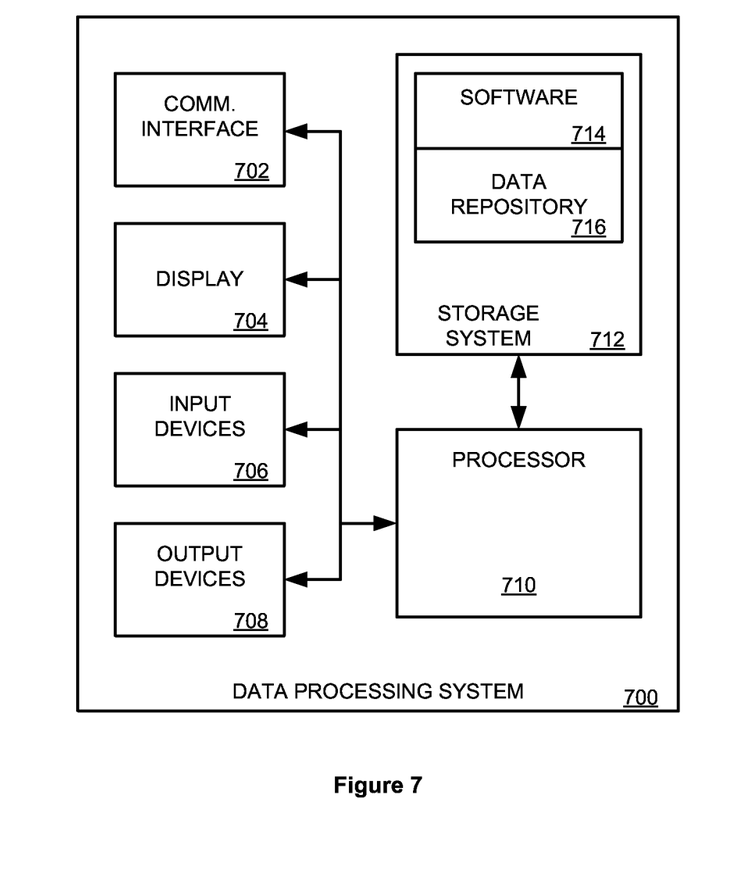
FIG. 7 illustrates a block diagram of a computer system configured to operate as a data processing system.

Data processing system 300 may be any type of computing system capable of processing graphical elements, such as a server computer, client computer, internet appliance, or any combination or variation thereof. FIG. 7, discussed in more detail later, provides a more detailed illustration of an example data processing system. Indeed, data processing system 300 may be implemented as a single computing system, but may also be implemented in a distributed manner across multiple computing systems. For example, data processing system 300 may be representative of a server system (not shown) with which the computer systems (not shown) running software 301 may communicate to enable data processing features. However, data processing system 300 may also be representative of the computer systems that run software 306. Indeed, data processing system 300 is provided as an example of a general purpose computing system that, when implementing the method illustrated in FIG. 2, becomes a specialized system capable of operating as a data processing system.

Data processing system 300 includes processor 302, storage system 304, and software 306. Processor 302 is communicatively coupled with storage system 304. Storage system 304 stores data processing software 306 which, when executed by processor 302, directs data processing system 300 to operate as described for the method illustrated in FIG. 2.

Referring still to FIG. 3, processor 302 may comprise a microprocessor and other circuitry that retrieves and executes data processing software 306 from storage system 304. Processor 302 may be implemented within a single processing device but may also be distributed across multiple processing devices or sub-systems that cooperate in executing program instructions. Examples of processor 302 include general purpose central processing units, application specific processors, and graphics processors, as well as any other type of processing device.

Storage system 304 may comprise any storage media readable by processor 302 and capable of storing data processing software 306. Storage system 304 may include volatile and nonvolatile, removable and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 may comprise additional elements, such as a controller, capable of communicating with processor 302.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Data processing software 306 comprises computer program instructions, firmware, or some other form of machine-readable processing instructions having at least some portion of the method illustrated in FIG. 2 embodied therein. Data processing software 306 may be implemented as a single application but also as multiple applications. Data processing software 306 may be a stand-alone application but may also be implemented within other applications distributed on multiple devices, including but not limited to other human machine interface software and operating system software.

In general, data processing software 306 may, when loaded into processor 302 and executed, transform processor 302, and data processing system 300 overall, from a general-purpose computing system into a special-purpose computing system customized to act as a data processing system as described by the method illustrated in FIG. 2 and its associated discussion.

Encoding data processing software 306 may also transform the physical structure of storage system 304. The specific transformation of the physical structure may depend on various factors in different implementations of this description. Examples of such factors may include, but are not limited to: the technology used to implement the storage media of storage system 304, whether the computer-storage media are characterized as primary or secondary storage, and the like.

For example, if the computer-storage media are implemented as semiconductor-based memory, data processing software 306 may transform the physical state of the semiconductor memory when the software is encoded therein. For example, data processing software 306 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Referring again to FIGS. 2 and 3, through the operation of data processing system 300 employing data processing software 306, transformations are performed on first data 314, second data 318, third data 322, and fourth data 326 within data repository 310, resulting in first metadata 316, second metadata 320, third metadata 324, and fourth metadata 328 within metadata store 312. As an example, data request 308 could be received by processor 302 and used to determine which blocks of data within data repository 310 need to be read or written and to determine the contents of one or more metadata within metadata store 312. In some embodiments, metadata store 312 may be stored within data repository 310.

Data processing system 300 may have additional devices, features, or functionality. Data processing system 300 may optionally have input devices such as a keyboard, a mouse, a voice input device, or a touch input device, and comparable input devices. Output devices such as a display, speakers, printer, and other types of output devices may also be included. Data processing system 300 may also contain communication connections and devices that allow data processing system 300 to communicate with other devices, such as over a wired or wireless network in a distributed computing and communication environment. These devices are well known in the art and need not be discussed at length here.

Figure 4:
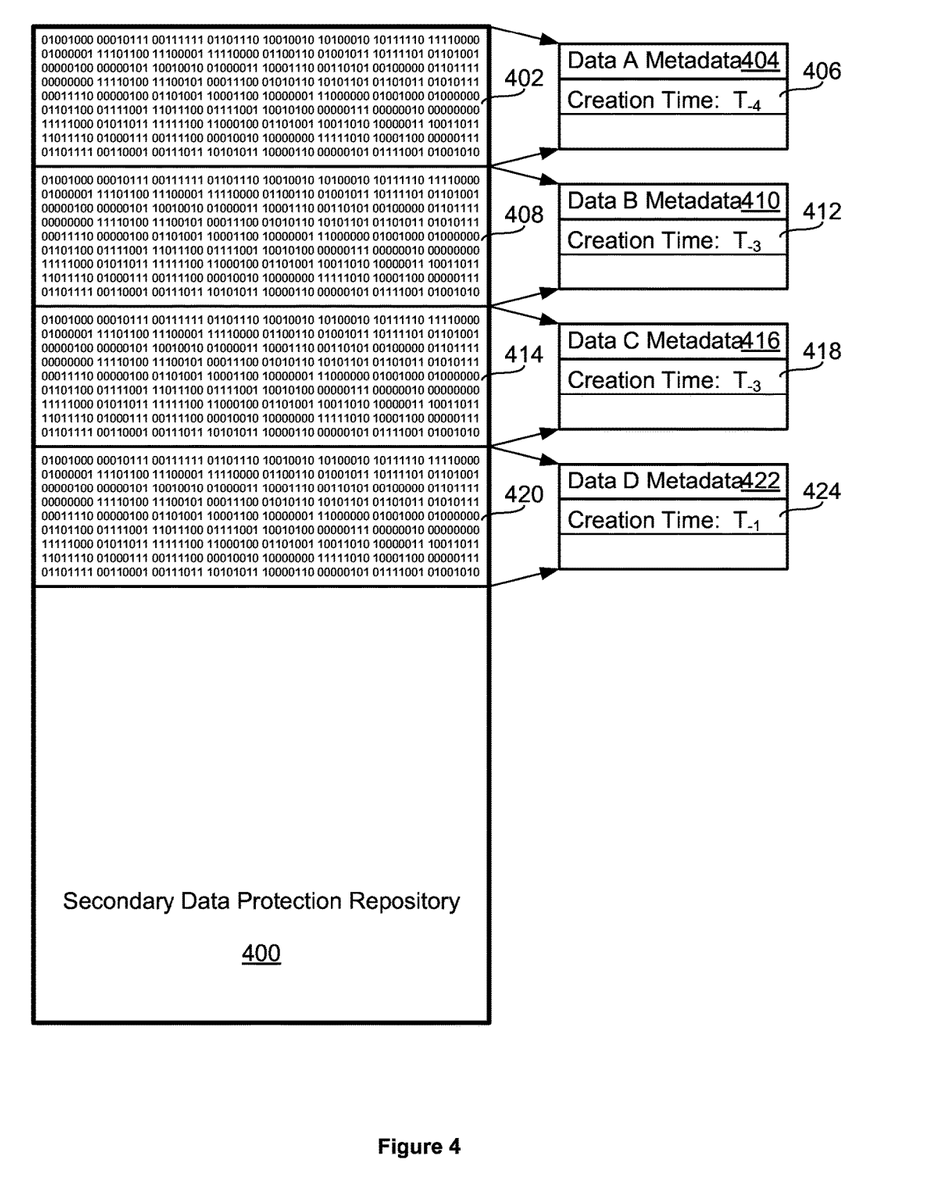
FIG. 4 illustrates a secondary data protection repository and metadata associated with the blocks of data within the secondary data protection repository.

FIG. 4 illustrates a secondary data protection repository 400 and metadata associated with the blocks of data within secondary data protection repository 400. Secondary data protection repository 400 includes four blocks of data: Data A 402, Data B 408, Data C 414, and Data D 420.

In this example embodiment, Data A 402 corresponds to Data A Metadata 404, which comprises the creation time 406 of $T_{-4}$ for Data A 402, Data B 408 corresponds to Data B Metadata 410, which comprises the creation time 412 of $T_{-3}$ for Data B 408, Data C 414 corresponds to Data C Metadata 416, which comprises the creation time 418 of $T_{-2}$ for Data C 414, Data D 420 corresponds to Data D Metadata 422, which comprises the creation time 424 of $T_{-4}$ for Data D 420.

Figure 5:
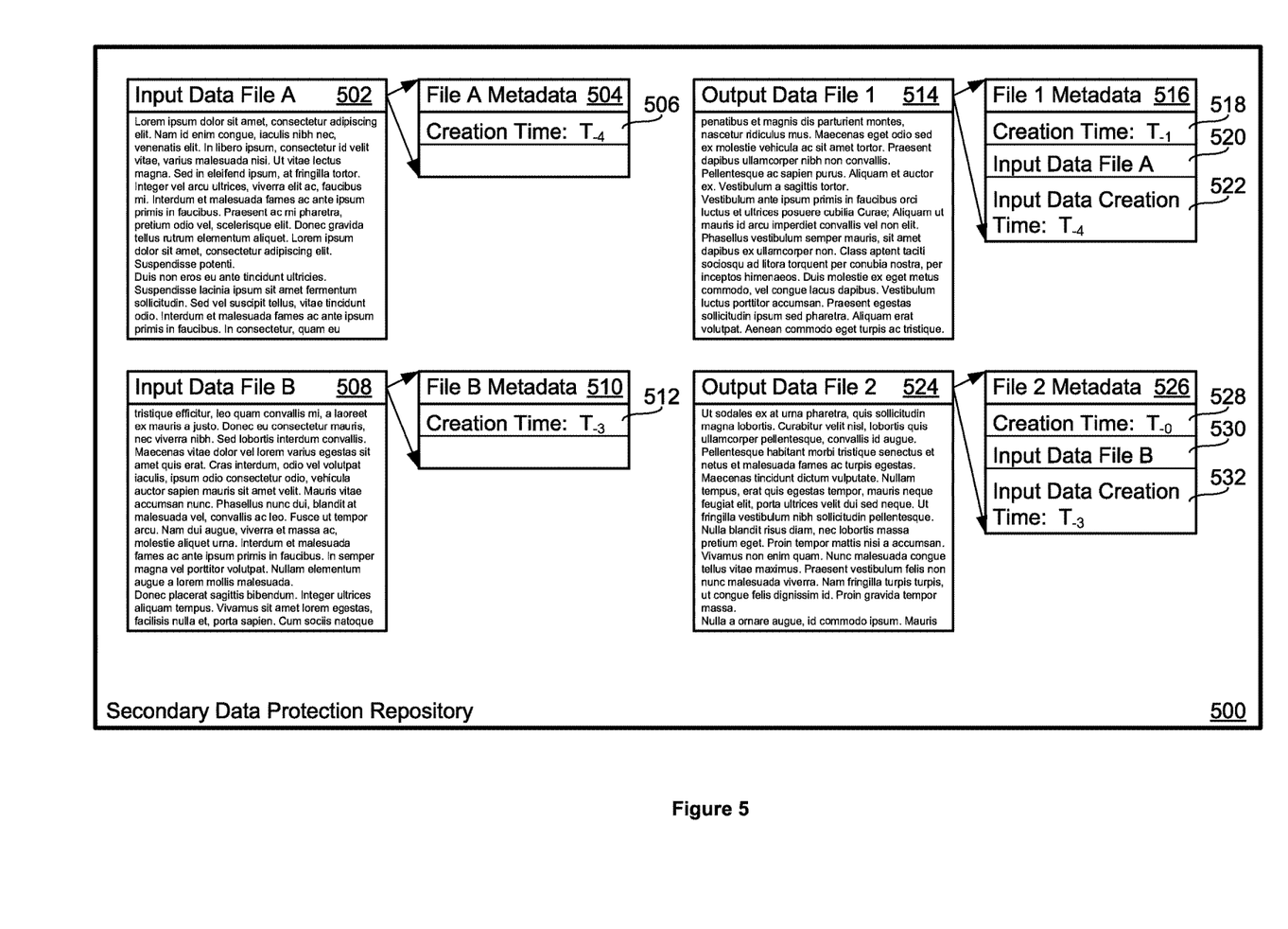
FIG. 5 illustrates a secondary data protection repository containing input and output data files, along with their associated metadata.

FIG. 5 illustrates a secondary data protection repository 500 containing input and output data files, along with their associated metadata. While this embodiment includes the metadata within secondary data protection repository 500, other embodiments may store the metadata elsewhere.

In this example, secondary data protection repository 500 contains Input Data File A 502, File A Metadata 504, Input Data File B 508, File B Metadata 510, Output Data File 1 514, File 1 Metadata 516, Output Data File 2 524, and File 2 Metadata 526. File A Metadata 504 includes a creation time 506 of $T_{-4}$ for Input Data File A. File B Metadata 510 includes a creation time 512 of $T_{-3}$ for Input Data File B. File 1 Metadata 516 includes a creation time 518 of $T_{-1}$ for Output Data File 1, a link or pointer 520 to Input Data File A, and a creation time 522 of $T_{-4}$ for Input Data File A. File 2 Metadata 526 includes a creation time 528 of $T_{-0}$ for Output Data File 2, a link or pointer 530 to Input Data File B, and a creation time 532 of $T_{-3}$ for Input Data File B.

Figure 6:
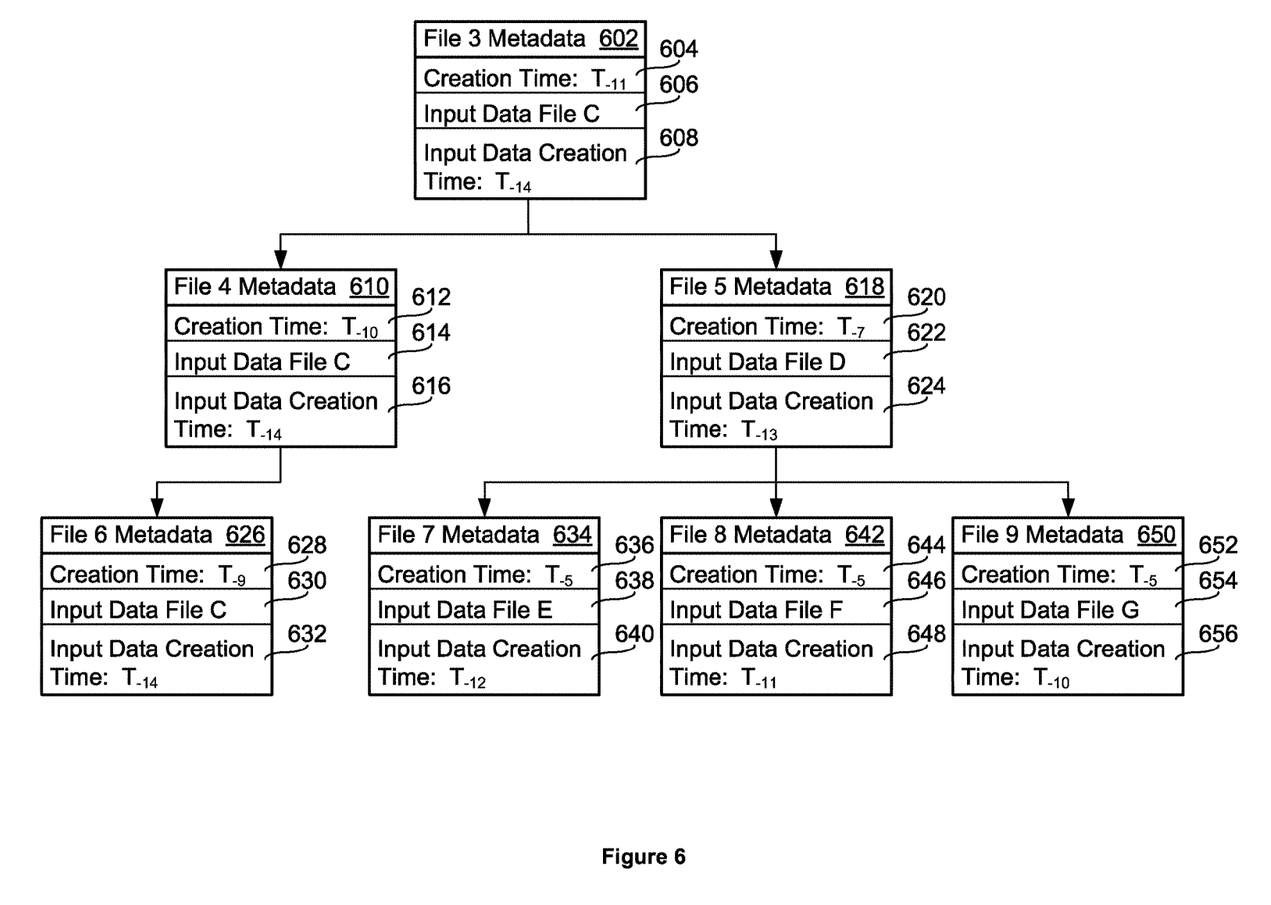
FIG. 6 illustrates a hierarchical structure for a plurality of metadata associated with a plurality of blocks of data within a secondary data protection repository.

FIG. 6 illustrates a hierarchical structure 600 for a plurality of metadata associated with a plurality of blocks of data within a secondary data protection repository. In this example, metadata corresponding to seven different blocks of data within a secondary data protection repository is organized into a hierarchical structure.

File 3 Metadata 602 comprises a creation time 604 of $T_{-11}$ for its corresponding block of data, a link or pointer 606 to Input Data File C, and a creation time 608 of $T_{-14}$ for Input Data File C. File 4 is based on File 3, and so File 4 Metadata 610 comprises a creation time 612 of $T_{-10}$ for its corresponding block of data, a link or pointer 614 to Input Data File C, and a creation time 616 of $T_{-14}$ for Input Data File C. File 5 is based on File 3, and so File 5 Metadata 618 comprises a creation time 620 of $T_{-7}$ for its corresponding block of data, a link or pointer 622 to Input Data File D, and a creation time 624 of $T_{-13}$ for Input Data File D. File 4 Metadata 610 and File 5 Metadata 618 are therefore one hierarchical level below File 3 Metadata 602 since they are both based on File 3.

File 6 is based on File 4, and so File 6 Metadata 626 comprises a creation time 628 of $T_{-9}$ for its corresponding block of data, a link or pointer 630 to Input Data File C, and a creation time 632 of $T_{-14}$ for Input Data File C. File 6 Metadata 626 is therefore one hierarchical level below File 4 Metadata 610 since it is based on File 4.

File 7 is based on File 5, and so File 7 Metadata 634 comprises a creation time 636 of $T_{-5}$ for its corresponding block of data, a link or pointer 638 to Input Data File E, and a creation time 640 of $T_{-12}$ for Input Data File E. File 8 is based on File 5, and so File 8 Metadata 642 comprises a creation time 644 of $T_{-5}$ for its corresponding block of data, a link or pointer 646 to Input Data File F, and a creation time 648 of $T_{-11}$ for Input Data File F. File 9 is based on File 5, and so File 9 Metadata 650 comprises a creation time 652 of $T_{-5}$ for its corresponding block of data, a link or pointer 654 to Input Data File G, and a creation time 656 of $T_{-10}$ for Input Data File G. File 7 Metadata 634, File 8 Metadata 642, and File 9 Metadata 650 are therefore one hierarchical level below File 5 Metadata 618 since they are all based on File 5.

FIG. 7 illustrates a block diagram of a computer system configured to operate as a data processing system 700. The method illustrated in FIG. 2 is implemented on one or more data processing systems 700, as shown in FIG. 7. Data processing system 700 includes communication interface 702, display 704, input devices 706, output devices 708, processor 710, and storage system 712. Processor 710 is linked to communication interface 702, display 704, input devices 706, output devices 708, and storage system 712. Storage system 712 includes a non-transitory memory device that stores operating software 714.

Communication interface 702 includes components that communicate over communication links, such as network cards, ports, RF transceivers, processing circuitry and software, or some other communication devices. Communication interface 702 may be configured to communicate over metallic, wireless, or optical links. Communication interface 702 may be configured to use TDM, IP, Ethernet, optical networking, wireless protocols, communication signaling, or some other communication format—including combinations thereof.

Display 702 may be any type of display capable of presenting information to a user. Displays may include touch screens in some embodiments. Input devices 706 include any device capable of capturing user inputs and transferring them to data processing system 700. Input devices 706 may include a keyboard, mouse, touch pad, or some other user input apparatus. Output devices 708 include any device capable of transferring outputs from data processing system 700 to a user. Output devices 708 may include printers, projectors, displays, or some other user output apparatus. Display 704, input devices 706, and output devices 708 may be external to data processing system 700 or omitted in some examples.

Processor 710 includes a microprocessor and other circuitry that retrieves and executes operating software 714 from storage system 712. Storage system 712 includes a disk drive, flash drive, data storage circuitry, or some other non-transitory memory apparatus. Operating software 714 includes computer programs, firmware, or some other form of machine-readable processing instructions. Operating software 714 may include an operating system, utilities, drivers, network interfaces, applications, or some other type of software. When executed by processing circuitry, operating software 714 directs processor 710 to operate data processing system 700 according to the method illustrated in FIG. 2.

In this example, data processing system 700 executes a number of methods stored as software 714 within storage system 712. The results of these methods are displayed to a user via display 704, or output devices 708. Input devices 706 allow a user to send data requests to data processing system 700.

For example, processor 710 receives data requests either from communication interface 702 or input devices 706. Processor 710 then operates on the data requests to produce data which may be stored in storage system 712 (within data depository 716), displayed on display 704, or output through output devices 708. Processor 710 also operates on data stored in data depository 716, reading and writing blocks of data, and metadata corresponding to the blocks of data.

Figure 8A:
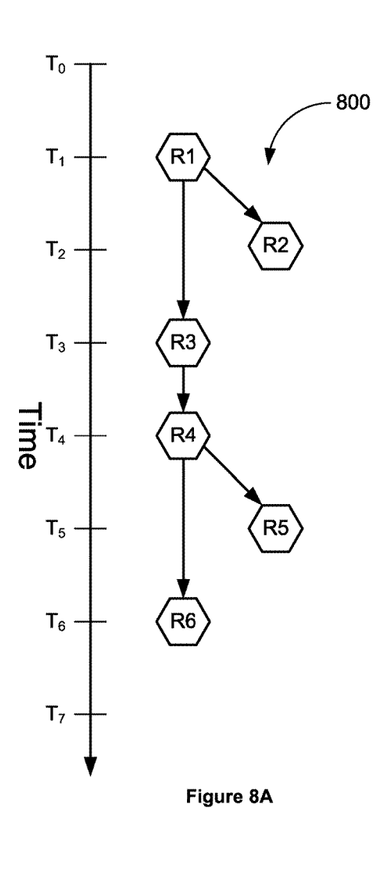
FIGS. 8A, 8B, and 8C illustrate example data version trees showing the results of a pruning sequence.
Figure 8B:
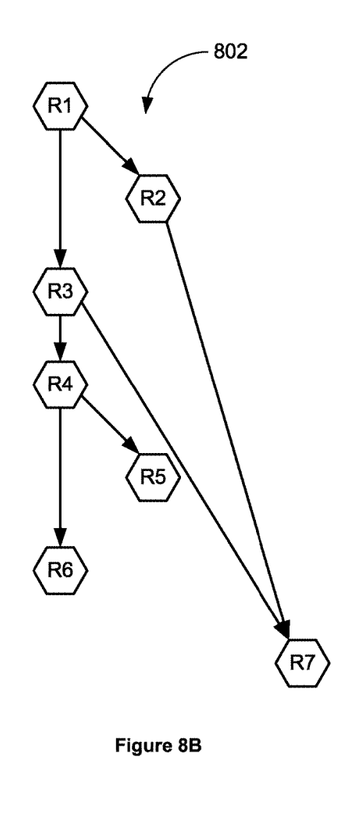
Figure 8C:
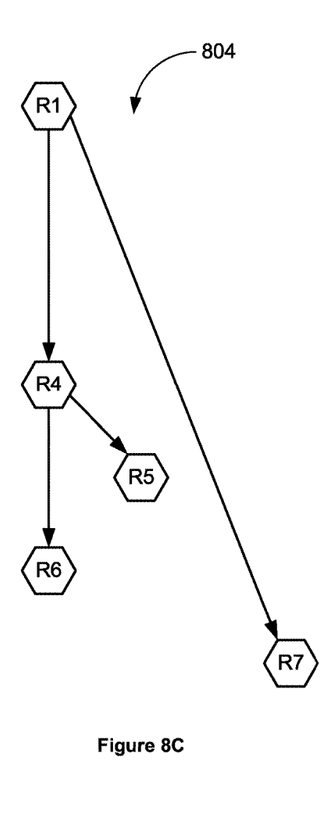

FIGS. 8A, 8B, and 8C illustrate example data version trees showing the results of a pruning sequences. In this example, a user wishes to prune revisions R2 and R3. FIG. 8A shows the initial version tree 800 with revisions R2 and R3 based on revision R1. During the prune at time T7, revisions R2 and R3 are merged together into revision R7 as illustrated by version tree 802 in FIG. 8B. After merging revisions R2 and R3 into R7, revisions R2 and R3 are removed, as illustrated by version tree 804 in FIG. 8C. Following the pruning sequence, revision R4 is now the child of parent R1, and revision R7 is the child of parent R1 since R1 was the common parent of revisions R2 and R3. This minimizes the version hierarchy changes of the revisions in the tree.

Figure 9:
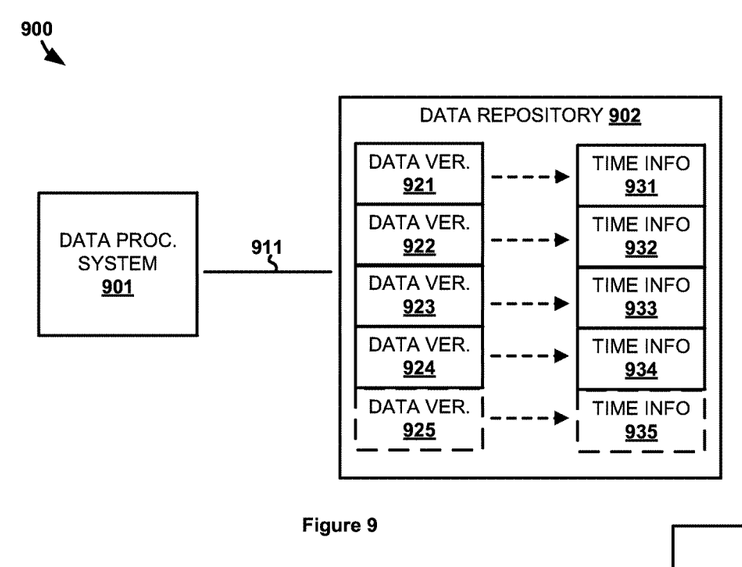
FIG. 9 illustrates a computing environment to enhance the organization, storage, and retrieval of data.

FIG. 9 illustrates computing environment 900 to enhance the organization, storage, and retrieval of data. Computing environment 900 includes data processing system 901 and data repository 902. Data processing system 901 and data repository 902 communicate over communication link 911. Communication link 911 may be a direct link or may include intervening networks, systems, or devices—including combinations thereof. Additionally, communication link 911 may be an internal system bus if data processing system 901 and data repository 902 are incorporated into a common device.

In operation, data processing system 901 stores incremental data versions 921-924 of a primary data repository to function as a backup repository for the primary data repository. By design, incremental data versions only store data items that have changed (e.g. modified or added) since the previous data version was stored. Thus, only the initial data version needs to store all data items upon which future incremental versions will depend. In this example, data version 924 is the newest data version and includes changed data items since data version 923 was stored in data repository 902, data version 923 includes change data items since data version 922 was stored in data repository 902, and so on, Incremental data versions 921-924 are examples of the revisions in the revision trees discussed above. Also, while data version 921 is the e oldest illustrated data version in computing environment 900, older data versions upon which data version 921 depends may exist.

In this example, respective time information 931-934 is also stored in data repository 902 for each of data versions 921-924. The time information may comprise the metadata discussed in embodiments above and includes information describing when each data version was created (e.g. stored) in data repository 902, by data processing system 901. As shown in time information table 1001 of FIG. 10, time information 931-934 indicates when each of data versions 921-924 were created. Since data version 921 is the oldest data version shown in computing environment 900, time information 931 indicates that data version 921 was created at time T0. Each subsequent data version was created at subsequent times T1-T3.

Figure 10:
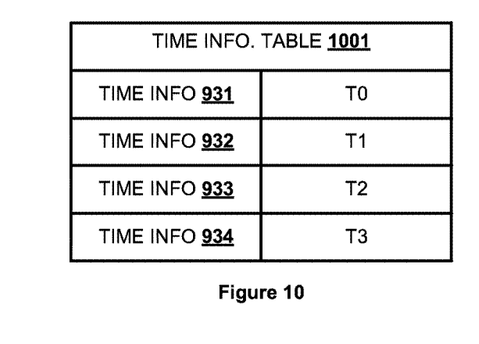
FIG. 10 illustrates time information used to enhance the organization, storage, and retrieval of data.

Time information 931-934 may further indicate data version(s) from which each data version depends such that the time information can be used to identify data items that are included a particular data version. For example, while data version 924 actually stores only changed data items since data version 923 was stored, data items stored in prior versions 921-923 may still be considered part of data version 924. Accordingly, time information 931-934 may be structured in a manner similar to that described in FIG. 6 to better identify data items that make up each data version. It should therefore be understood that time information 931-934 is merely formatted in table 1001 for illustrative purposes and may be formatted in some other manner.

When a new data version 925 is created and added to data repository 902, corresponding time information 935 is also generated and stored in data repository 902, Data version 925 may comprise a new backup version of a primary data repository or may comprise a modification of a previous data version 921-924 already stored in data repository 902. For instance, data version 925 may comprise a modification of data items in data version 922 and data version 925 therefore maintains the changed data items from data version 922. In that case, in addition to indicating the time T4 that data version 925 was created, time information 935 indicates that data version 925 depends from data version 922.

Figure 11:
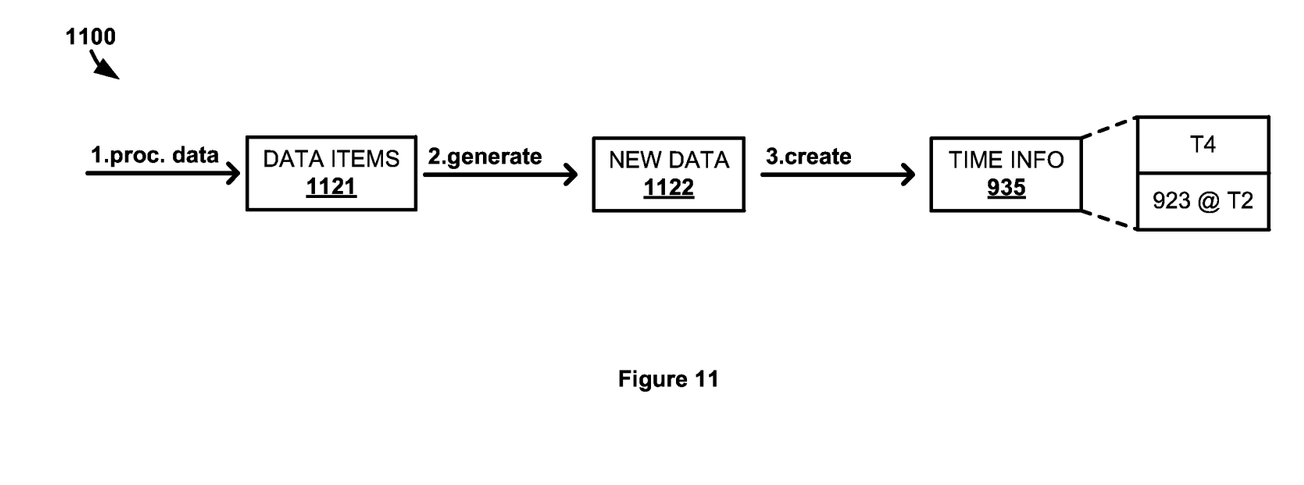
FIG. 11 illustrates an example scenario of the computing environment to enhance the organization, storage, and retrieval of data.

FIG. 11 illustrates example scenarios 1100 of computing environment 300 generating data version 925. In scenario 1100, data items 1121 that are included in data version 923, for this example, are processed at step 1 to generate new data 1122 at step 2. Data version 923 may be indicated by a user who wants data processing system 901 to perform a processing operation on data items 1121 rather than data items that may only exist in more recent data version 924. The processing performed may be any type of data processing operation. Even if new data 1122 is a modification of existing data in data version 923, the unmodified data remains as part of data version 923 and the modified data is written to 902 as new data in data version 925. As noted above, due to the nature of incremental data versions it should be understood that data items 1121 are not necessarily exclusively data items stored in data version 923 that were changed since data version 922. Rather, data version 923's dependency on previous data versions means unchanged data items that still existed in the primary data repository when data version 923 was created may be stored as part of prior versions.

New data 1122 will be included in and stored as data version 925 in data repository 902. At step 3, time information 935 is created indicating that data version 925 and the new data therein was created at time T5. Time information also indicates that data version 925 was created from data version 923, which was created at time T2. Accordingly, incremental data versions 925 and 924 both depend upon data version 923 and store data items that have changed from data version 923. This allows data items in data version 923 to be modified and stored without having to first restore a data repository to data version 923. Moreover, time information 935 allows data version 925 to maintain its proper dependency on data version 923 without interfering with the version dependencies of other incremental backups. That is, during the next incremental backup of a primary data repository at time T5, that new data version will depend upon data version 924 and not data version 925 even though data version 925 is more recently created. In other words, while data version 925 depends from data version 923, data version 925 is not in the incremental sequence of the other data versions since it was not generated as an incremental backup of a primary data repository.

Additionally, in some situations, data processing system 901 may merge two sequential data versions. Continuing the example from above, both data version 924 and data version 925 depend from data version 923. If data version 923 were to be merged with data version 922 to create a new data version 923 that includes changed data items since data version 921, the both data versions 924 and 925 will then depend upon that new data version 923. In other words, data processing system 901 in this example, may only merge two sequential data versions (e.g. backup versions of data repository data repository 902). Merging an offshoot version into a sequential data version, such as version 925 into version 923 from which it depends, would adversely effect the dependency of data version 924, which depended on the original form of data version 923. Although, if another branch data version is created from data version 925 and then incorporated into data version 925, that combination would not effect the dependency of data version 924.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer-implemented method comprising:
    storing a plurality of incremental data versions in a data repository, each of the plurality of incremental data versions depending from another incremental data version sequentially, each incremental data version associated with first time information including creation time of the incremental data version and a dependency of the incremental data version from the other incremental data version;
    receiving a request to create a data version from one of the incremental data versions, the request including a set of write operations to be performed on data corresponding to a time point;
    in response to the request:
        identifying a first incremental data version from the plurality of incremental data versions, the first incremental data version associated with the first time information including creation time matching the time point;

creating a second data version based on the first data version by performing the set of write operations to the first incremental data version in the data repository; and storing the second data version in the data repository, the second data version associated with second time information including creation time of the second data version and a dependency of the second data version from the first incremental data version.

2. The method of claim 1, wherein the plurality of incremental data versions include a third incremental data version depending from the first incremental data version and stored before creation of the second data version.

3. The method of claim 2, wherein the incremental data versions include a fourth incremental data version upon which the first incremental data version depends, further comprising:

creating a fifth data version by merging the first incremental data version with the fourth incremental data version;

storing the fifth data version in the data repository;

updating the dependency of the second data version from the first incremental data version to the fifth data version; and updating the dependency of the third incremental data version from the first incremental data version to the fifth data version.

4. The method of claim 3, further comprising:
deleting the first incremental data version and the fourth incremental data version from the data repository.

5. The method of claim 1, wherein the incremental data versions include at least one incremental data version created later than the first incremental data version.

6. The method of claim 1, further comprising:
receiving a request to retrieve data corresponding to the time point;

in response to the request to retrieve data:
identifying a first incremental data version from the plurality of incremental data versions, the first time information associated with the first incremental data version including creation time matching the time point;

identifying a set of incremental data versions and a base data version from which the first incremental data version depends;

retrieving data items stored in the first incremental data version, the set of incremental data versions, and the base data version; and providing the retrieved data items including the data corresponding to the time point.

7. The method of claim 1, further comprising storing metadata including the first time information associated with the incremental data versions in the data repository.

8. The method of claim 1, further comprising storing metadata including a pointer to the other incremental data version.

9. The method of claim 8, wherein the metadata further includes creation time of the other incremental data version.

10. The method of claim 1, further comprising storing a base data version from which the incremental data versions depend.

11. A system comprising:
one or more computer readable storage media;
a processing system operatively coupled with the one or more computer readable storage media; and program instructions stored on the one or more computer readable storage media that, when read and executed by the processing system, direct the processing system to:

store a plurality of incremental data versions in a data repository, each of the plurality of incremental data versions depending from another incremental data version sequentially, each incremental data version associated with first time information including creation time of the incremental data version and a dependency of the incremental data version from the other incremental data version;

receive a request to create a data version from one of the incremental data versions, the request including a set of write operations to be performed on data corresponding to a time point;

in response to the request:
identify a first incremental data version from the plurality of incremental data versions, the first incremental data version associated with the first time information including creation time matching the time point;

create a second data version based on the first data version by performing the set of write operations to the first incremental data version in the data repository; and store the second data version in the data repository, the second data version associated with second time information including creation time of the second data version and a dependency of the second data version from the first incremental data version; and maintain second time information associated with the creation of the second data and creation of the first data version.

12. The system of claim 11, wherein the plurality of incremental data versions include a third incremental data version depending from the first incremental data version and stored before creation of the second data version.

13. The system of claim 12, wherein the incremental data versions include a fourth incremental data version upon which the first incremental data version depends and wherein the program instructions further direct the processing system to:

create a fifth data version by merging the first incremental data version with the fourth incremental data version;

store the fifth data version in the data repository;

update the dependency of the second data version from the first incremental data version to the fifth data version; and update the dependency of the third incremental data version from the first incremental data version to the fifth data version.

14. The system of claim 13, wherein the program instructions further direct the processing system to:
delete the first incremental data version and the fourth incremental data version from the data repository.

15. The system of claim 11, wherein the incremental data versions include at least one incremental data version created later than the first incremental data version.

16. The system of claim 11, wherein the program instructions further direct the processing system to:
receive a request to retrieve data corresponding to the time point;

in response to the request to retrieve data:
identify a first incremental data version from the plurality of incremental data versions, the first time information associated with the first incremental data version including creation time matching the time point;

identify a set of incremental data versions and a base data version from which the first incremental data version depends;

retrieve data items stored in the first incremental data version, the set of incremental data versions, and the base data version; and provide the retrieved data items including the data corresponding to the time point.

17. The system of claim 11, wherein the program instructions further direct the processing system to:

store metadata including the first time information associated with the incremental data versions in the data repository.

18. The system of claim 11, wherein the program instructions further direct the processing system to store metadata including a pointer to the other incremental data version wherein the metadata includes an indicator of which incremental data version.

19. The system of claim 18, wherein metadata further includes creation time of the other incremental data version.

20. The system of claim 11, wherein the program instructions further direct the processing system to store a base data version from which the incremental data versions depend.

* * * * *

UNITED STATES PATENT AND TRADEMARK OFFICE
CERTIFICATE OF CORRECTION

PATENT NO. : 10,229,128 B2  
APPLICATION NO. : 14/946491  
DATED : March 12, 2019  
INVENTOR(S) : Lu et al.

Page 1 of 1

It is certified that error appears in the above-identified patent and that said Letters Patent is hereby corrected as shown below:

In the Specification

In Column 3, Line 12, delete "Front" and insert --From-- therefor

In Column 3, Line 63, after "R1", insert --,--

In Column 7, Line 59, delete "702" and insert --704-- therefor

In Column 8, Line 33, delete "sequences." and insert --sequence.-- therefor

In Column 8, Line 36, delete "T7," and insert --$T_7$,-- therefor

In Column 9, Line 2, delete "on," and insert --on.-- therefor

In Column 9, Line 4, after "the", delete "e"

In Column 9, Line 12, delete "902," and insert --902-- therefor

In Column 9, Line 35, delete "902," and insert --902.-- therefor

In Column 10, Lines 31-32, delete "data repository data repository" and insert --data repository-- therefor In the Claims In Column 13, Lines 19-21, in Claim 18, delete "version wherein the metadata includes an indicator of which incremental data version." and insert --version.-- therefor Signed and Sealed this  
Twenty-eighth Day of December, 2021

Drew Hirshfeld  
*Performing the Functions and Duties of the  
Under Secretary of Commerce for Intellectual Property and  
Director of the United States Patent and Trademark Office*